United States Patent
Yamamoto et al.

(10) Patent No.: US 12,230,057 B2
(45) Date of Patent: Feb. 18, 2025

(54) IMAGE PROCESSING APPARATUS, IMAGE PROCESSING METHOD, IMAGE INPUT APPARATUS, IMAGE PROCESSING SYSTEM, AND PROGRAM

(71) Applicant: CANON KABUSHIKI KAISHA, Tokyo (JP)

(72) Inventors: Takahisa Yamamoto, Kanagawa (JP); Hiroshi Sato, Kanagawa (JP); Atsuo Nomoto, Tokyo (JP); Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 375 days.

(21) Appl. No.: 17/555,122

(22) Filed: Dec. 17, 2021

(65) Prior Publication Data
US 2022/0114837 A1  Apr. 14, 2022

Related U.S. Application Data

(63) Continuation of application No. PCT/JP2020/021930, filed on Jun. 3, 2020.

(30) Foreign Application Priority Data

Jun. 27, 2019  (JP) .................. 2019-120329

(51) Int. Cl.
*G06V 40/16* (2022.01)
*G06V 10/75* (2022.01)
*G06V 10/82* (2022.01)

(52) U.S. Cl.
CPC .......... *G06V 40/172* (2022.01); *G06V 10/757* (2022.01); *G06V 10/82* (2022.01); *G06V 40/168* (2022.01)

(58) Field of Classification Search
CPC ..................................... Y02D 10/00
See application file for complete search history.

(56) References Cited

U.S. PATENT DOCUMENTS 9,189,709 B2 *  11/2015  Saruta .................. G06V 10/772

FOREIGN PATENT DOCUMENTS

| CN | 115017789 A | * | 9/2022 |
| JP | 2015194927 A | | 11/2015 |
| JP | 2018147474 A | | 9/2018 |

OTHER PUBLICATIONS

Chen, Yuntao, et al. "DarkRank: Accelerating Deep Metric Learning via Cross Sample Similarities Transfer" arXiv.Org, Jul. 5, 2017, https://arxiv.org/abs/1707.01220v2. (Year: 2017).*

(Continued)

*Primary Examiner* — Matthew C Bella
*Assistant Examiner* — Johnny B Duong
(74) *Attorney, Agent, or Firm* — Canon U.S.A., Inc. IP Division

(57) ABSTRACT

An image processing apparatus includes a first extraction unit configured to subject an input image to first extraction processing to extract a first feature quantity, a second extraction unit configured to subject the input image to second extraction processing having a lower throughput than the first extraction processing to extract a second feature quantity, a comparison unit configured to compare the first feature quantity with the second feature quantity and then output a comparison result, and an update unit configured to update parameters to be used for the second extraction processing by the second extraction unit, based on the comparison result.

15 Claims, 8 Drawing Sheets

(56) References Cited

OTHER PUBLICATIONS

Lan, Xu, et al. "Knowledge Distillation by On-the-Fly Native Ensemble." arXiv.Org, Jun. 12, 2018, https://arxiv.org/abs/1806.04606v2. (Year: 2018).*

* cited by examiner

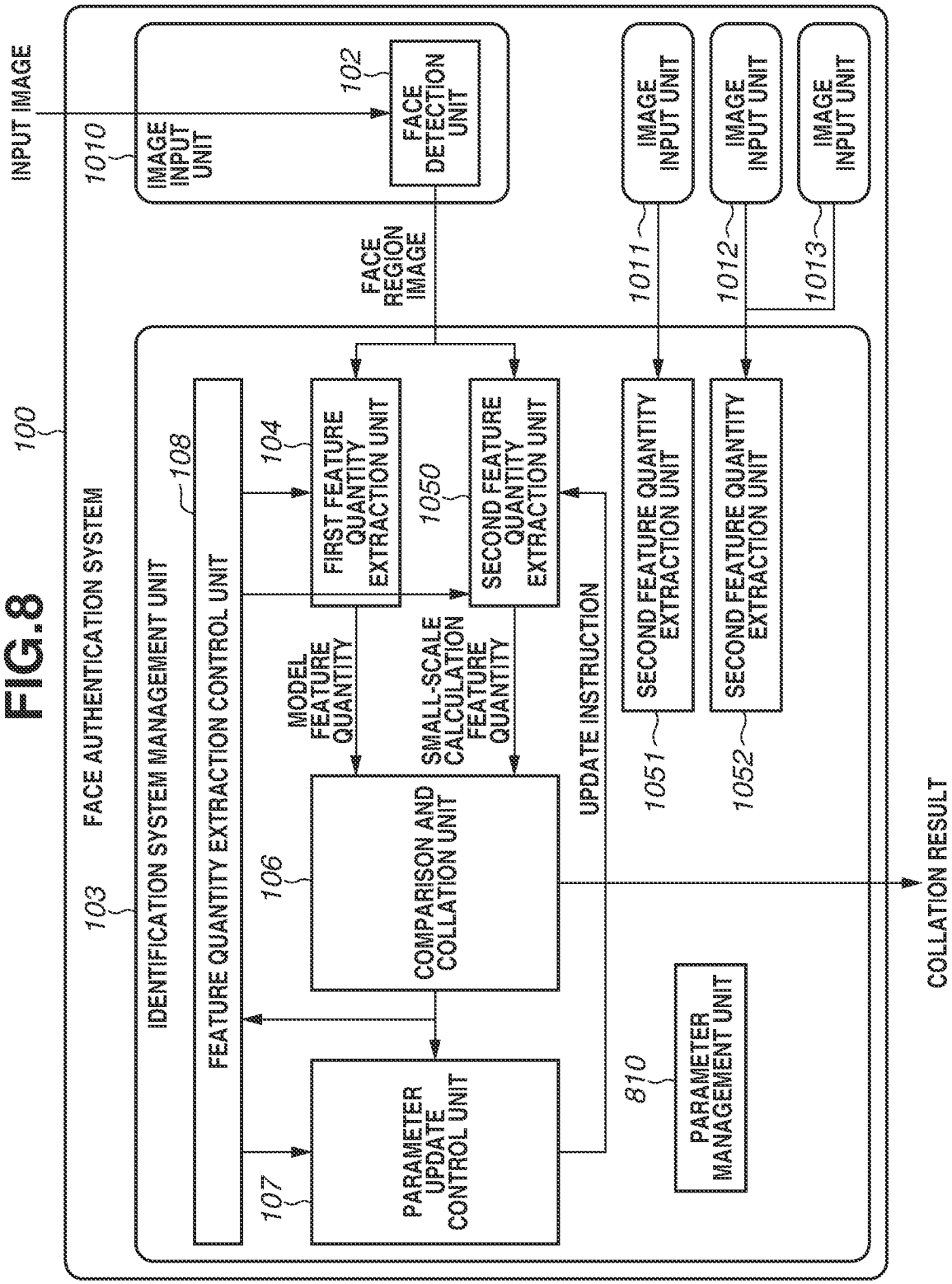

IMAGE PROCESSING APPARATUS, IMAGE PROCESSING METHOD, IMAGE INPUT APPARATUS, IMAGE PROCESSING SYSTEM, AND PROGRAM

CROSS-REFERENCE TO RELATED APPLICATIONS

This application is a Continuation of International Patent Application No. PCT/JP2020/021930, filed Jun. 3, 2020, which claims the benefit of Japanese Patent Application No. 2019-120329, filed Jun. 27, 2019, both of which are hereby incorporated by reference herein in their entirety.

BACKGROUND OF THE INVENTION

Field of the Invention

The present invention relates to image processing for identifying which one of pre-registered classes an object existing in an input image belongs to. More particularly, the present invention relates to the face authentication for identifying which one of pre-registered faces of persons a face existing in an input image is.

Background Art

There have been proposed many techniques for highly processing the image of an object in a captured image to extract useful information. In particular, techniques using a multilevel neural network called a deep net (also referred to as a deep neural net or deep learning) have been actively researched and developed in relation to the face authentication. The face authentication refers to a technique for comparing an input face image with a plurality of pre-registered face images of persons (referred to as registered face images) to determine which person the input face image belongs to.

As described above, the deep-net-based identification processing has been actively researched and developed. However, there is an issue that a large number of learning images are required for the deep net learning. Further, to achieve a more favorable accuracy, each learning image needs to be provided with a corresponding accurate ground truth value (identification class label).

To solve this issue, the technique discussed in Japanese Patent Application Laid-Open No. 2018-147474 reduces the cost of learning data collection by instructing a first learning module to learn by using existing learning data and then instructing a second learning module to learn by using the output of the first learning module as teacher data.

There is another issue that, at present, the deep-net-based identification processing has not yet achieved such completeness that constantly enables the perfect authentication. Depending on the condition of input image capturing, invalid authentication (another identification class is recognized by mistake) may occur.

In the face authentication, for example, the identification accuracy may be remarkably degraded depending on the camera installation condition. Particularly when a camera is installed at a high position like a monitoring camera, and only look-down face images are constantly obtained, the accuracy degradation is predicted. A possible cause of this accuracy degradation is a remarkable difference in image variation between the time of learning and the time of practice use. Example cases of accuracy degradation include a case where the face authentication that has learned only front face images is practically used under a camera installation condition for inputting only look-down images. Japanese Patent Application Laid-Open No. 2018-147474 does not take into consideration the accuracy degradation due to such a camera installation condition.

Although learning may be performed by using images obtained at the time of practice use, a ground truth value (class label) is required for each image at the time of regular learning. There arises an issue that such learning is not realistic since it requires manual generation of ground truth values and other troublesome and time-consuming works.

Likewise, there arises another issue that performing the face authentication by using a threshold value assumed at the time of learning cannot achieve an expected face authentication accuracy. This is because there is a remarkable difference in image variation between the time of learning and the time of practice use. In other words, invalid authentication and incomplete authentication are determined by a threshold value. There has been a case where the expected face authentication accuracy cannot be achieved because the threshold value considered to be suitable at the time of learning turns out to be unsuitable for images at the time of practice use.

SUMMARY OF THE INVENTION

In order to solve the above-described issue, according to an aspect of the present invention, an image processing apparatus includes a first extraction unit configured to subject an input image to first extraction processing to extract a first feature quantity, a second extraction unit configured to subject the input image to second extraction processing having a lower throughput than the first extraction processing to extract a second feature quantity, a comparison unit configured to compare the first feature quantity with the second feature quantity and then output a comparison result, and an update unit configured to update parameters to be used for the second extraction processing by the second extraction unit, based on the comparison result.

Further features of the present invention will become apparent from the following description of exemplary embodiments with reference to the attached drawings.

BRIEF DESCRIPTION OF THE DRAWINGS

FIG. 8 is a block diagram illustrating still another face authentication system.

DESCRIPTION OF THE EMBODIMENTS

Preferred exemplary embodiments of the present invention will be described in detail below with reference to the accompanying drawings.

First Exemplary Embodiment

The first exemplary embodiment is directed to implementing the face authentication by using a neural network with as low throughput as possible. The face authentication has conventionally been implemented based on large-scale learning using a large number of learning images and on a large-scale neural network using the learning result. In this case, by limiting the robustness of the face authentication to the installation condition of a camera into which an image to be processed is input, the throughput can be reduced without degrading the face authentication accuracy.

Figure 1:
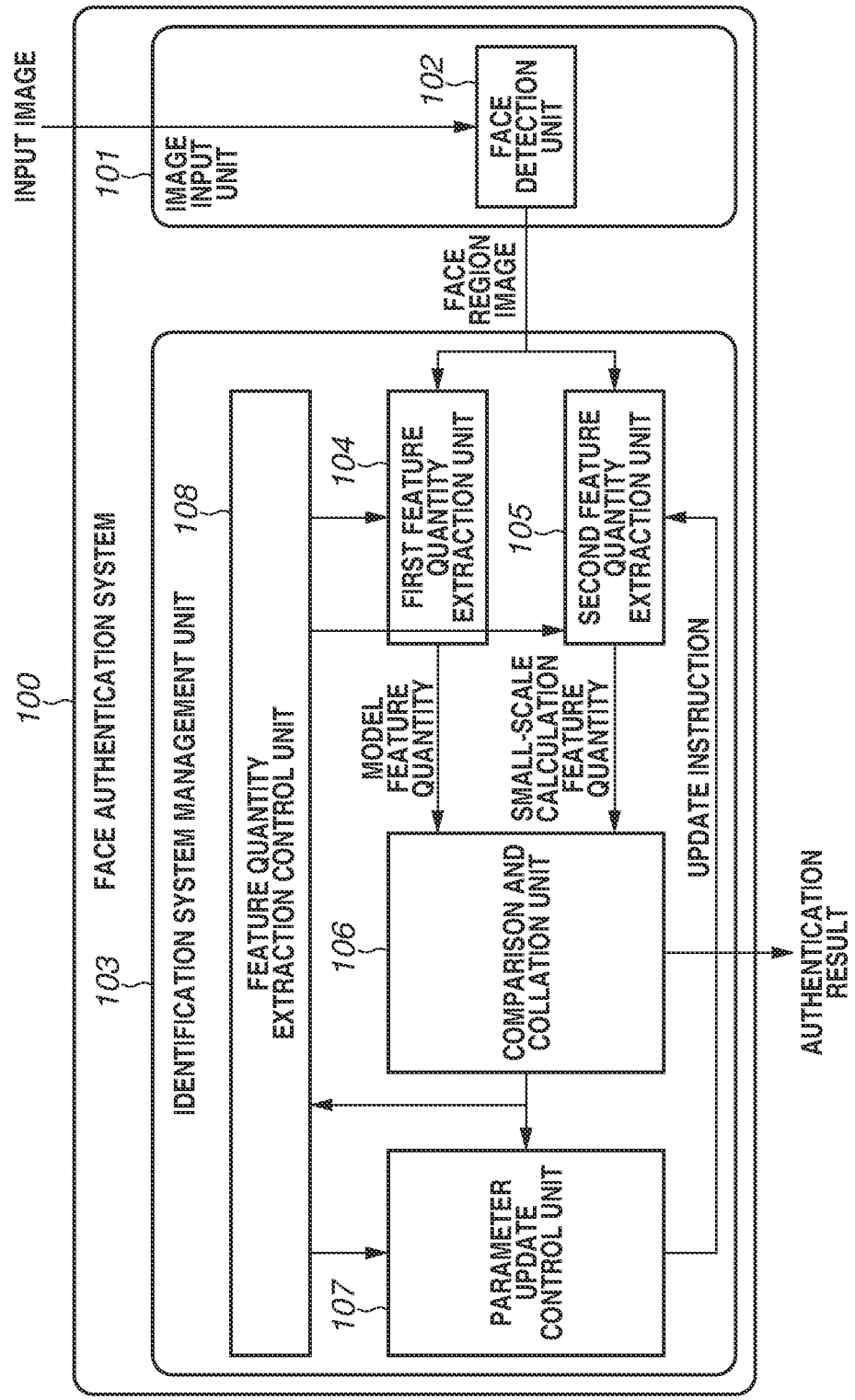
FIG. 1 is a block diagram illustrating a face authentication system.

An image processing system according to the present exemplary embodiment will be descried in detail below. FIG. 1 is a block diagram illustrating a configuration of a face authentication system 100 as an image processing system according to the present exemplary embodiment.

An image input unit 101 is an image input apparatus that supplies image data including a subject on which the face authentication is performed. According to the present exemplary embodiment, the image input unit 101 is a camera from which a captured image is input. The image input unit 101 may be disposed on a location physically apart from an image processing apparatus as an identification system management unit 103, and configured to transfer videos to the identification system management unit 103 via a network. An input image is not limited to the image currently being captured, and a regeneration image of a captured recording image may be input to the image input unit 101.

A face detection unit 102 detects a face for image data input to the image input unit 101. A known method may be used as a facial detection method. An example method may extract shapes corresponding to the components of the facial region such as the nose, mouth, and eyes, estimate the size of the face based on the sizes of the eyes and the distance between them, and, based on the position corresponding to the center of the nose, recognize the region surrounded by the region with the estimated size, as the face region. The image data of the detected face region is normalized to a constant size by a predetermined method, and then input as a face region image to the identification system management unit 103.

Although, in the present exemplary embodiment, the face detection unit 102 is included in the image input unit 101 as a camera, the face detection unit 102 may be included in the identification system management unit 103. In this case, the image input unit 101 needs to transmit the entire input image to the identification system management unit 103. On the other hand, when the face detection unit 102 is included in the image input unit 101 as in the present exemplary embodiment, the image input unit 101 needs to transmit only the face region to the identification system management unit 103 as described above. Therefore, this case is suitable in terms of a small amount of data to be transmitted. The face region image is transmitted from the image input unit 101 to the identification system management unit 103.

The face region image transmitted from the image input unit 101 is input to a first feature quantity extraction unit 104. The first feature quantity extraction unit 104 presets feature quantity extraction parameters obtained from the large-scale learning using a large number of learning images including diverse variations, and is implemented by a large-scale neural network (teacher model) using the feature quantity extraction parameters. "Diverse variations" in this case means face capturing conditions such as facial orientations and ambient lighting conditions. Although the first feature quantity extraction unit 104 implemented in this way has a high throughput and processes a large number of parameters, the first feature quantity extraction unit 104 is capable of extracting the feature quantity for implementing a favorable face authentication accuracy. The feature quantity calculated by the first feature quantity extraction unit 104 is referred to as a model feature quantity in the sense that a favorable face authentication accuracy can be achieved. (Accordingly, the feature quantity extraction parameters set in the first feature quantity extraction unit 104 are referred to as model feature quantity extraction parameters.)

The second feature quantity extraction unit 105 inputs the face region image transmitted from the image input unit 101 (an image that is the same as the face region image input to the first feature quantity extraction unit 104). The second feature quantity extraction unit 105 includes a smaller amount of feature quantity extraction parameters and a neural network (student model) with a lower throughput than the above-described first feature quantity extraction unit 104. Therefore, the second feature quantity extraction unit 105 is subordinated to the first feature quantity extraction unit 104 in terms of the capability of extracting the feature quantity for individual identification while maintaining the robustness against diverse variations. Instead, the second feature quantity extraction unit 105 is capable of extracting the feature quantity with a low throughput.

More specifically, the second feature quantity extraction unit 105 requires less amount of calculation resources (memory capacity and calculation unit performance) and shorter calculation time than the first feature quantity extraction unit 104. To distinguish from the model feature quantity output by the first feature quantity extraction unit 104, the feature quantity calculated by the second feature quantity extraction unit 105 is referred to as a small-scale calculation feature quantity. (Accordingly, the feature quantity extraction parameters set in the second feature quantity extraction unit 105 are referred to as small-scale calculation feature quantity extraction parameters.)

A comparison and collation unit 106 compares the model feature quantity output by the first feature quantity extraction unit 104 with the small-scale calculation feature quantity output by the second feature quantity extraction unit 105, and outputs the result of the comparison. For example, according to the present exemplary embodiment, the comparison and collation unit 106 outputs the Euclidean distance between the model feature quantity and the small-scale calculation feature quantity as a comparison result. The comparison and collation unit 106 collates the feature quantity extracted from the first feature quantity extraction unit 104 or the second feature quantity extraction unit 105 with the pre-registered facial feature quantity to subject faces in the input image to the face authentication.

A parameter update control unit 107 updates the small-scale calculation feature quantity extraction parameters of the second feature quantity extraction unit 105 so as to decrease the difference between the two feature quantities by using the comparison result output from the comparison and collation unit 106. For example, the parameter update control unit 107 updates the small-scale calculation feature quantity extraction parameters of the second feature quantity extraction unit 105 so as to decrease the distance between the two feature quantities output from the comparison and collation unit 106. The updated small-scale calculation feature quantity extraction parameters are set in the second feature quantity extraction unit 105.

A known method may be used to update the parameters. For example, when the comparison and collation unit 106 outputs the Euclidean distance between the two feature quantities, the parameter update control unit 107 may update the small-scale calculation feature quantity extraction parameters by using the error back propagation to decrease the Euclidean distance as an error.

The small-scale calculation feature quantity extraction parameters may be updated each time the input image is transmitted from the image input unit 101 (each time the distance between the two feature quantities is output from the comparison and collation unit 106) or each time a predetermined number of input images are transmitted therefrom. When the small-scale calculation feature quantity extraction parameters are updated each time a predetermined number of input images are transmitted, the parameters are updated assuming that the average value of a plurality of distances obtained from a plurality of images is an error. Therefore, this parameter update method is suitable in the sense that the parameters are hardly updated while being subjected to an excessive effect of the error calculated from one specific image. The parameter update processing may be continued until the error decreases to fall in a predetermined reference range, or ended after the error back propagation has been repeated a predetermined number of times.

A feature quantity extraction control unit 108 controls operations of the first feature quantity extraction unit 104 and the second feature quantity extraction unit 105 based on the comparison result output from the comparison and collation unit 106. The two feature quantity extraction units are supplied with face region images in parallel from the image input unit 101. Based on the comparison result of the two feature quantities, the feature quantity extraction control unit 108 reduces the operation frequency of either one feature quantity extraction unit to degrade the activity, operates only one feature quantity extraction unit, or operates both feature quantity extraction units.

According to the present exemplary embodiment, the feature quantity extraction control unit 108 operates as follows based on the comparison result input from the comparison and collation unit 106. When the input comparison result (difference) is larger than a predetermined threshold value, the feature quantity extraction control unit 108 operates both the first feature quantity extraction unit 104 and the second feature quantity extraction unit 105. At the same time, the feature quantity extraction control unit 108 controls the parameter update control unit 107 to update the small-scale calculation feature quantity extraction parameters. The state where the feature quantity extraction control unit 108 performs this control is referred to as an initial state.

When the feature quantity extraction control unit 108 determines that the state where the input comparison result is smaller than the predetermined threshold value is attained for a predetermined number of input images, the feature quantity extraction control unit 108 stops the operation of the first feature quantity extraction unit 104. At the same time, the feature quantity extraction control unit 108 controls the parameter update control unit 107 to stop updating the small-scale calculation feature quantity extraction parameters. The state where the feature quantity extraction control unit 108 performs this control is referred to as a steady state. The predetermined number of input images is determined to avoid the transition from the initial state to the steady state simply because the distance between the two feature quantities happens to decrease for a certain image. More specifically, the state continues where the distance between the two feature quantities stably decreases for several images, and then the face authentication system 100 enters the steady state from the initial state.

When there is a large difference between the two feature quantities, i.e., in the initial state, the feature quantity extraction control unit 108 performs control in this way to update the small-scale calculation feature quantity extraction parameters via the parameter update control unit 107, thus decreasing the difference between the two feature quantities. As a result, when the difference between the two feature quantities decreases, the face authentication system 100 enters the steady state. Then, the feature quantity extraction is performed only by the second feature quantity extraction unit 105, making it possible to extract feature quantities at a high speed.

The collation processing using the extracted feature quantities can be implemented by using a known method. For example, the method subjects the image (registered image) of the person to be authenticated to the feature quantity extraction processing, and pre-registers the extracted feature quantity in association with the person. Then, the method calculates the Euclidean distance between the feature quantity for the registered image and the feature quantity for the input image. When the distance is smaller than a predetermined threshold value, the method determines that the face image of the input image belongs to the person of the registered image.

This completes the description of the configuration of the face authentication system 100. As described above, the face authentication system 100 includes two different feature quantity extraction units (the first feature quantity extraction unit 104 and the second feature quantity extraction unit 105), which are different in the throughput and the number of feature quantity extraction parameters.

The second feature quantity extraction unit 105 includes a smaller number of feature quantity extraction parameters and a neural network (student model) with a lower throughput than those of the first feature quantity extraction unit 104. Therefore, as a general tendency, the second feature quantity extraction unit 105 is subordinated to the first feature quantity extraction unit 104 in terms of the capability of extracting a feature quantity for individual identification while maintaining the robustness against diverse variations. However, according to the present exemplary embodiment, images to be input to the second feature quantity extraction unit 105 are limited to images captured by the image input unit 101. More specifically, by restricting image variations, with respect to a limited range of images, the second feature quantity extraction unit 105 is able to obtain a feature quantity for individual identification equivalent to that obtained by the first feature quantity extraction unit 104. For features specialized to the environment in which the image input unit 101 performs image capturing, the second feature quantity extraction unit 105 is able to obtain a feature quantity for individual identification equivalent to that obtained by the first feature quantity extraction unit 104.

More specifically, the first feature quantity extraction unit 104 is able to extract a favorable feature quantity for individual identification for an unlimited wide range of face images although an enormous amount of calculation resources is required. On the other hand, the second feature quantity extraction unit 105 is able to implement the feature quantity extraction by using a small amount of calculation resources although face images enabling extraction of favorable feature quantity for individual identification are limited to face images input by the image input unit 101.

To implement the second feature quantity extraction unit 105 characterized as above, the present exemplary embodiment compares the model feature quantity with the small-scale calculation feature quantity, and updates the small-scale calculation feature quantity extraction parameters to decrease the difference between the two feature quantities. In this case, the ground truth value (class label) required at the time of regular parameter update processing (learning) is not required. Therefore, troublesome and time-consuming works such as manual generation of ground truth values are not required, achieving rapid parameter update processing at a low cost.

After the difference between the model feature quantity and the small-scale calculation feature quantity decreases as a result of update, operating only the second feature quantity extraction unit 105 enables reducing the throughput of the face authentication. More specifically, immediately after the operation of the face authentication system 100 is started (the feature quantity extraction control unit 108 performs control for the initial state), a small number of face region images are transmitted from the image input unit 101. Therefore, there is a large difference between the model feature quantity and the small-scale calculation feature quantity at this timing. (For example, the small-scale calculation feature quantity extraction parameters of the second feature quantity extraction unit 105 are initialized with random numbers in the initial state.) To perform the face authentication in such a case, there is no choice but to use the model feature quantity and hence a high throughput is required for the face authentication.

However, it is assumed that, after a certain time period has elapsed since the operation of the face authentication system 100 is started, the parameters have been sufficiently updated and hence the difference between the model feature quantity and the small-scale calculation feature quantity has decreased. For face region images transmitted from the image input unit 101, both the first feature quantity extraction unit 104 and the second feature quantity extraction unit 105 output approximately the same feature quantity. Therefore, it is necessary neither to use the model feature quantity nor to operate the first feature quantity extraction unit 104 to perform the face authentication.

Under this condition, the feature quantity extraction control unit 108 selects the steady state control. In the steady state, the throughput required for the face authentication is reduced. When the throughput required for the face authentication is reduced, the number of face region images subjected to the feature extraction per unit time can be increased. The face authentication system that inputs a moving image is able to improve the rate of sampling still images from a moving image, possibly improving the face authentication accuracy.

Figure 2:
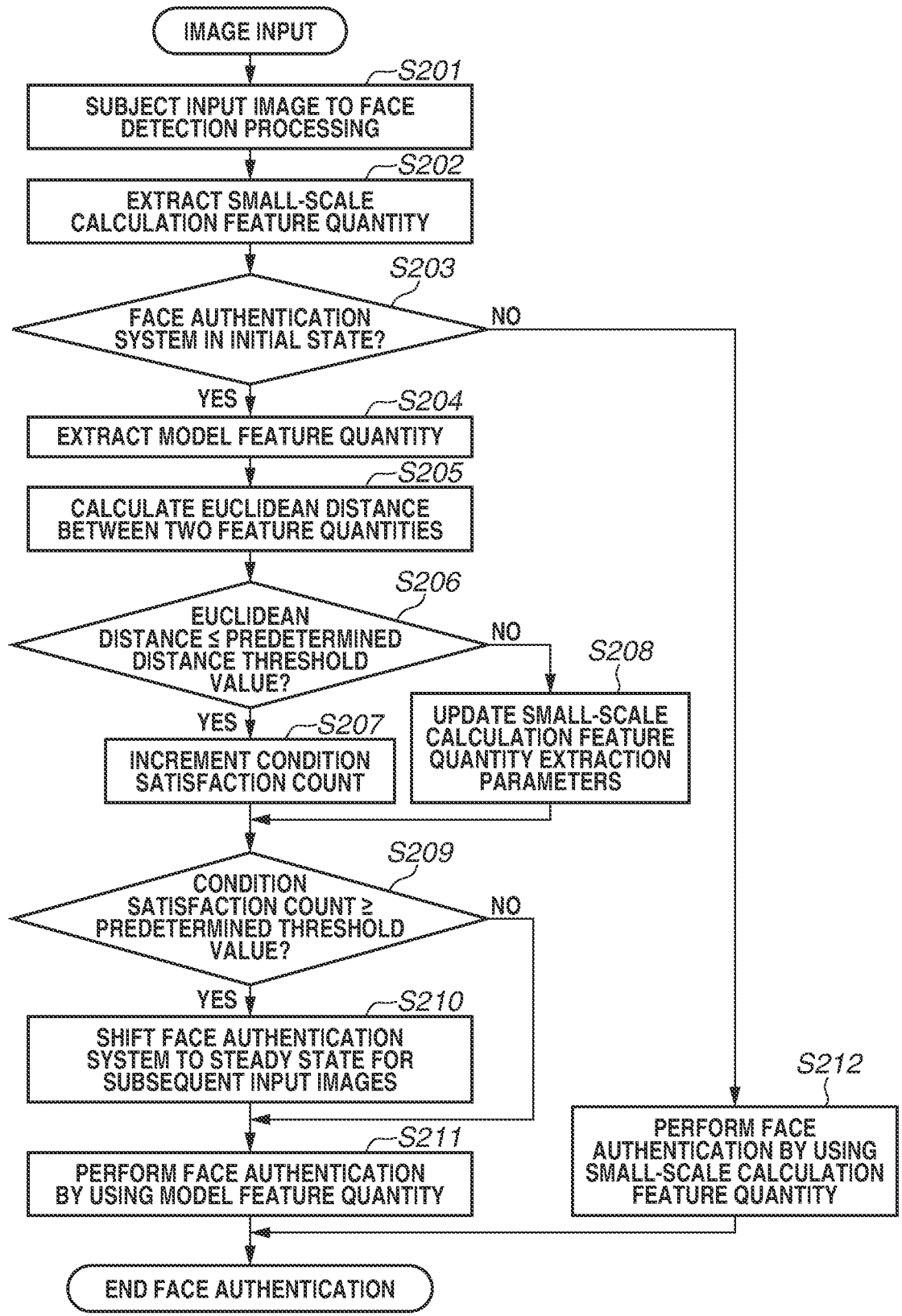
FIG. 2 is a flowchart illustrating processing of the face authentication system.

An operation sequence of the face authentication system 100 will be described below with reference to FIG. 2. FIG. 2 illustrates an operation sequence of the face authentication system for one input image. To simplify the description, it is assumed that one input image includes only one face image. When there is a plurality of face images, it is necessary to repeat the face detection and the subsequent processing the number of times corresponding to the number of faces.

The state where both the first feature quantity extraction unit 104 and the second feature quantity extraction unit 105 are operating to perform the parameter update processing based on the comparison result of the two feature quantities as described above is referred to as an initial state. The state where only the second feature quantity extraction unit 105 is operating is referred to as a steady state.

In step S201, the face detection unit 102 subjects the input image to the face detection. If no face is detected in the input image, the subsequent processing is skipped. In step S202, the second feature quantity extraction unit 105 extracts the small-scale calculation feature quantity. In step S203, the feature quantity extraction control unit 108 performs control corresponding to the condition of the face authentication system. More specifically, the feature quantity extraction control unit 108 determines whether the face authentication system 100 is in the initial state or in the steady state.

When the face authentication system 100 is in the initial state (YES in step S203), the processing proceeds to step S204. In step S204, the first feature quantity extraction unit 104 extracts the model feature quantity. In step S205, the comparison and collation unit 106 calculates the Euclidean distance between the two feature quantities.

In step S206, the feature quantity extraction control unit 108 determines whether the calculated Euclidean distance is smaller than a preset predetermined distance threshold value. When the calculated Euclidean distance is smaller than the preset predetermined distance threshold value (YES in step S206), the processing proceeds to step S207. In step S207, the feature quantity extraction control unit 108 increments the condition satisfaction count. On the other hand, when the Euclidean distance is larger than the predetermined distance threshold value (NO in step S206), the processing proceeds to step S208. In step S208, the small-scale calculation feature quantity extraction parameters are updated.

In step S209, the feature quantity extraction control unit 108 determines whether the condition satisfaction count is equal to or larger than a predetermined count threshold value. When the condition satisfaction count is equal to or larger than the threshold value (YES in step S209), the processing proceeds to step S210. In step S210, the state of the face authentication system transitions to the steady state. In step S211, the comparison and collation unit 106 subjects the input image to the face authentication processing by using the extracted model feature quantity. The collation processing using the feature quantity extracted as described above can be implemented by using a known method. In this case, the first feature quantity extraction unit 104 also subjects the registered image to the feature quantity extraction.

On the other hand, when the face authentication system 100 is in the steady state (NO in step S203), the processing proceeds to step S212. In step S212, the face authentication system 100 subjects the input image to the collation processing by using the extracted small-scale calculation feature quantity. In this case, the second feature quantity extraction unit 105 also subjects the registered image to the feature quantity extraction.

As described in detail above, in the face authentication system 100 according to the present exemplary embodiment, the feature quantity extraction can be performed only by the second feature quantity extraction unit 105 after a certain time period has elapsed since the operation of the face authentication system 100 was started. More specifically, the face authentication processing can be performed at a high speed without degrading the face authentication accuracy at the time of the initial state.

When the small-scale calculation feature quantity extraction parameters of the second feature quantity extraction unit 105 are updated (learned), the ground truth values (class labels) required at the time of regular parameter update processing (learning) are not required. Therefore, troublesome and time-consuming works such as manual generation of ground truth values are not required, achieving rapid parameter update processing at a low cost.

According to the present exemplary embodiment, the parameters for feature quantity extraction are learned by using the images of the installed camera. In the learning, the ground truth values (class labels) required at the time of regular learning are not required. This enables implementing the learning of the feature quantity extraction specialized for camera-specific input images (for example, face images in a look-down state) obtained according to the camera installation condition, at a low cost.

Since the face authentication system 100 is specialized for input images of the camera, the high-precision face authentication can be implemented with a low throughput by the second feature quantity extraction unit. Further, threshold values can also be adjusted according to the camera installation situation.

Examples of low-throughput neural networks (student models) include a student model specialized for backlight images, a student model specialized for front face images, and a student model specialized for look-down images. When disposing a large-scale neural network (teacher model) in a server and disposing a low-throughput neural network (student model) in each monitoring camera, the server manages student models 1 to n included in the monitoring cameras. Each monitoring camera (i) transmits a captured face image to the server. By using the managed the student model i and the teacher model, the server updates the student model i in such a manner that both models output the same feature vector, and transmits the student model i to a monitoring camera (i). The learning of the student model is also referred to as distillation learning.

(First Modification)

The first modification will be described below centering on an example where the feature quantity extraction and face authentication are performed in the image input unit. The present modification assumes that the face authentication is performed by a monitoring camera system, and assumes a monitoring camera as the image input unit and a server as the identification system management unit. The monitoring camera is connected to the server via a network. Generally, a plurality of monitoring cameras is connected to one server in many monitoring camera systems. Therefore, if the server performs the entire processing including the feature quantity extraction and the subsequent collation processing, the server will bear an enormous amount of load.

To reduce the load on the server, the present modification performs the feature quantity extraction and the subsequent collation processing in the monitoring cameras. However, the monitoring cameras are allowed to be provided with limited calculation resources. Simply performing the face authentication in the monitoring cameras in lieu of the server makes it difficult to implement the face authentication with a favorable accuracy by using the limited calculation resources.

The present modification will be described below centering on a method for implementing the face authentication with an accuracy equivalent to that of the face authentication by the server, even with the limited calculation resources in the monitoring cameras. A face authentication system according to the present modification will be described in detail below.

Figure 3:
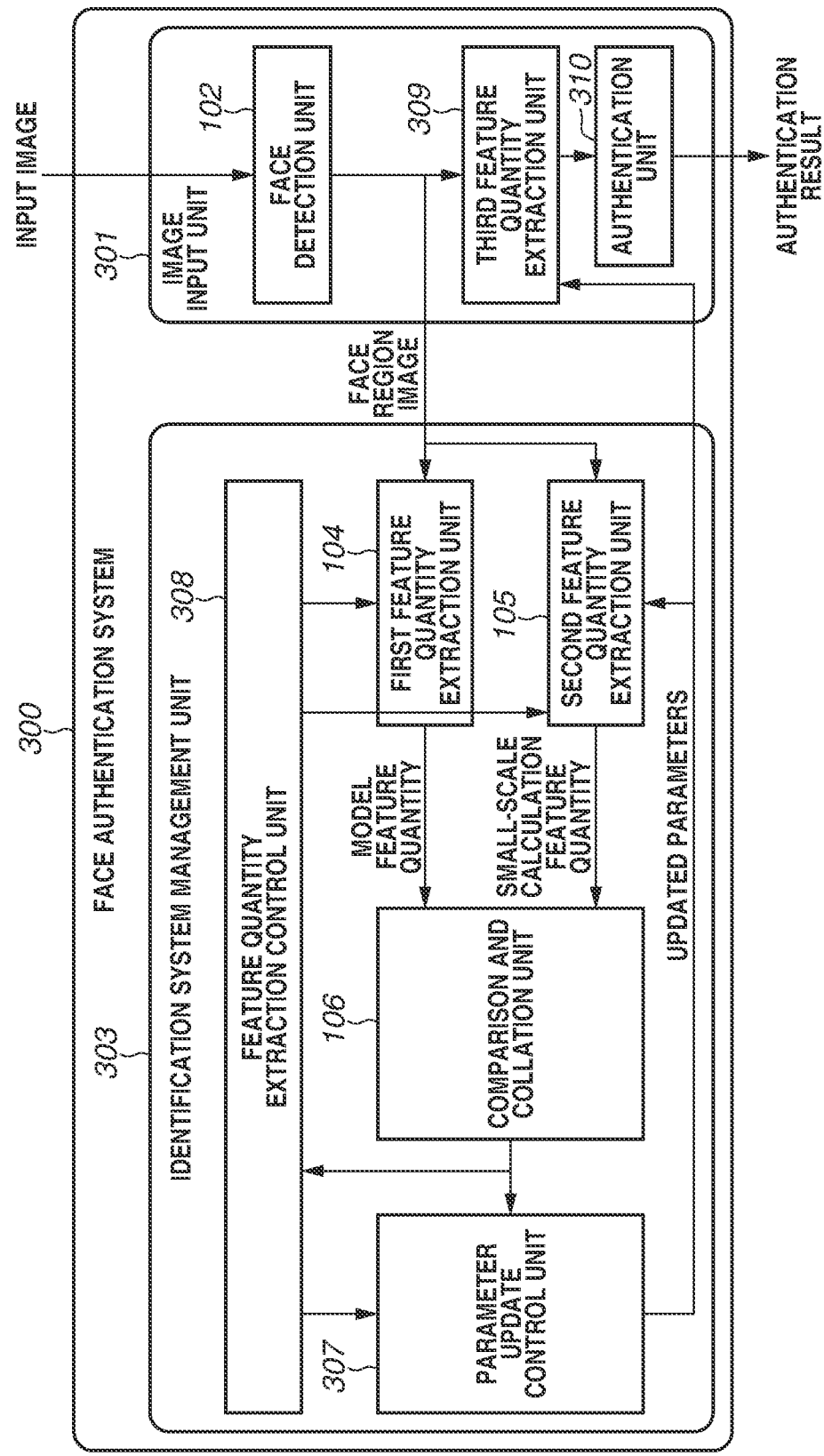
FIG. 3 is a block diagram illustrating another face authentication system.

FIG. 3 is a block diagram illustrating a configuration of a face authentication system 300 according to the present modification. Referring to FIG. 3, components having the same meaning as those in FIG. 1 are assigned the same reference numerals, and redundant descriptions thereof will be omitted.

As described above, the face authentication system 300 according to the present modification is configured to perform the face authentication processing in the image input unit 301 assumed to be a monitoring camera. According to the present modification, the image input unit 301 as a monitoring camera inputs the image currently being captured. The image input unit 301 outputs a face region image to the identification system management unit 303. The identification system management unit 303 outputs the feature quantity extraction parameters to be used by a third feature quantity extraction unit 309 included in the image input unit 301.

A parameter update control unit 307 performs the parameter update operation according to the first exemplary embodiment. Further, upon reception of an instruction from the feature quantity extraction control unit 308, the parameter update control unit 307 also outputs small-scale calculation feature quantity extraction parameters the same as those set in the second feature quantity extraction unit 105, to the third feature quantity extraction unit 309. This means that the same small-scale calculation feature quantity extraction parameters will be set in the second feature quantity extraction unit 105 and the third feature quantity extraction unit 309. Therefore, the small-scale calculation feature quantity output by the second feature quantity extraction unit 105 is identical to the feature quantity output by the third feature quantity extraction unit 309 (this feature quality is referred to as an in-camera feature quantity).

After reception of the small-scale calculation feature quantity extraction parameters from the parameter update control unit 307, the third feature quantity extraction unit 309 performs the same processing as the second feature quantity extraction unit 105. According to the present modification, like the first exemplary embodiment, the second feature quantity extraction unit 105 includes a smaller number of feature quantity extraction parameters and a neural network (student model) having a lower throughput than the first feature quantity extraction unit 104 (teacher model). Therefore, like the second feature quantity extraction unit 105, the third feature quantity extraction unit 309 is operable with a small amount of calculation resources and is also operable even in the image input unit 301 assumed to be a monitoring camera. The authentication unit 310 performs the face authentication by using the feature quantity extracted by the third feature quantity extraction unit 309. This face authentication is similar to the face authentication by the comparison and collation unit 106.

The feature quantity extraction control unit 308 controls whether to transmit the face region image transmitted from the image input unit 301, based on the comparison result output from the comparison and collation unit 106. According to the present modification, the feature quantity extraction control unit 308 operates as follows. When the comparison result input to the feature quantity extraction control unit 308 is larger than a predetermined threshold value, the feature quantity extraction control unit 308 permits the transmission of the face region image from the image input unit 301. At the same time, the feature quantity extraction control unit 308 operates both the first feature quantity extraction unit 104 and the second feature quantity extraction unit 105, and controls the parameter update control unit 307 to update the small-scale calculation feature quantity extraction parameters. The state where the feature quantity extraction control unit 308 performs such control is referred to as an initial state.

When the feature quantity extraction control unit 308 determines that the state where the comparison result (difference) input to the feature quantity extraction control unit 308 is smaller than the predetermined threshold value is attained for a predetermined number of input images, the feature quantity extraction control unit 308 inhibits the transmission of the face region image from the image input unit 301. At the same time, the feature quantity extraction control unit 308 instructs the parameter update control unit 307 to transmit the small-scale calculation feature quantity extraction parameter last updated at that timing to the third feature quantity extraction unit 309. When the transmission of the face region image stops, the first feature quantity extraction unit 104, the second feature quantity extraction unit 105, the comparison and collation unit 106, and the parameter update control unit 307 also inevitably stop operating. The state where the feature quantity extraction control unit 108 performs such control is referred to the steady state.

By performing such control in this way, the feature quantity extraction control unit 308 operates as follows. More specifically, when there is a large difference between the model feature quantity and the small-scale calculation feature quantity, i.e., in the initial state, the parameter update control unit 307 updates the small-scale calculation feature quantity extraction parameters, enabling control to decrease the difference between the two feature quantities. As a result, when the difference between the model feature quantity and the small-scale calculation feature quantity decreases, the face authentication system 100 enters the steady state.

When the face authentication system 100 enters the steady state, the small-scale calculation feature quantity extraction parameters set in the second feature quantity extraction unit 105 are also set in the third feature quantity extraction unit 309. Thus, for the same face region image, the small-scale calculation feature quantity output by the second feature quantity extraction unit 105 is identical to the in-camera feature quantity output by the third feature quantity extraction unit 309.

In the steady state, the feature quantity extraction is performed only by the third feature quantity extraction unit 309, and the authentication is performed only by the authentication unit 310. More specifically, the identification system management unit 303 (assumed to be a server) does not perform the feature quantity extraction and the subsequent collation processing. Instead, the feature quantity extraction and the subsequent collation processing can be performed in each image input unit 301 (assumed to be a monitoring camera).

Figure 4:
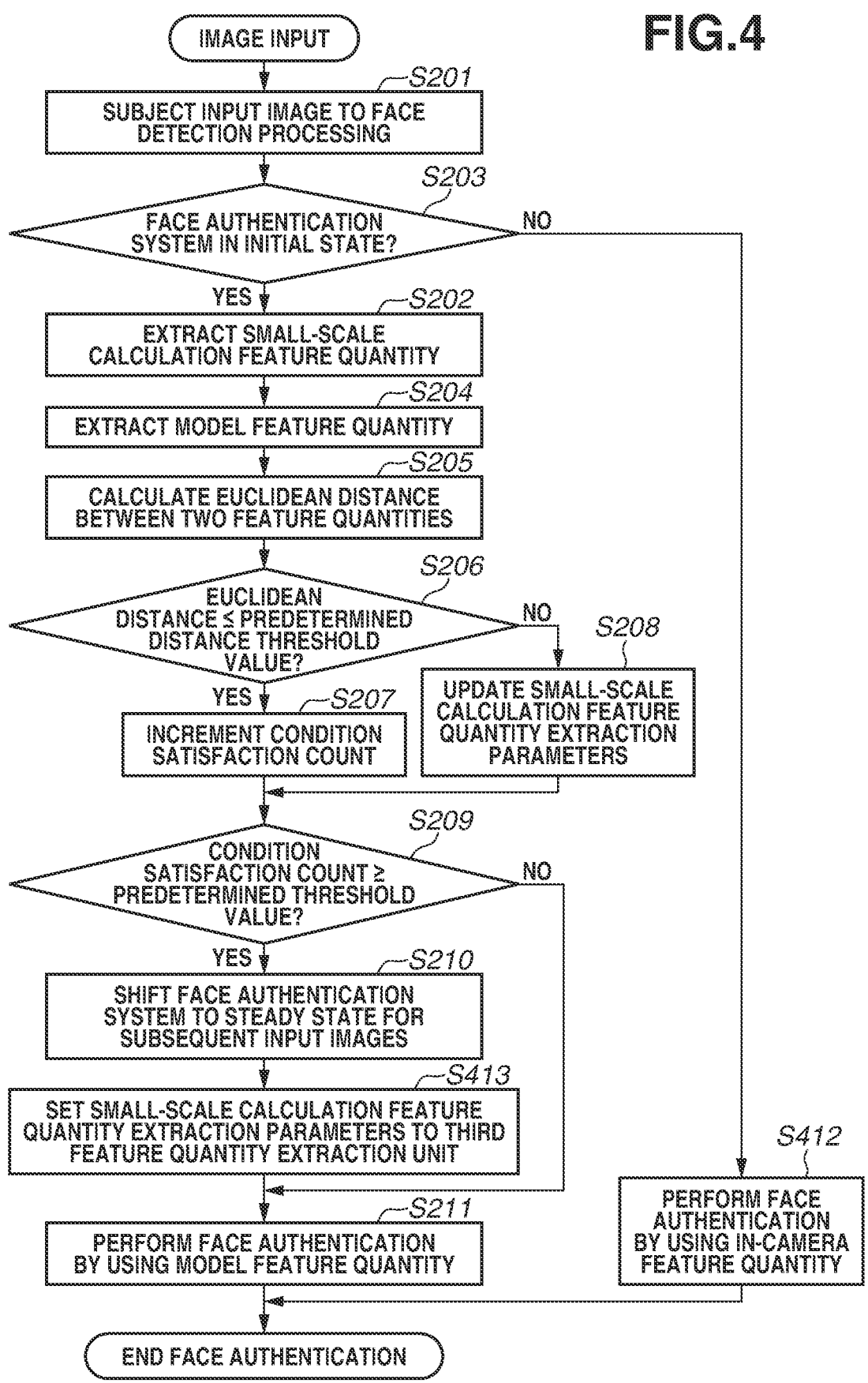
FIG. 4 is another flowchart illustrating processing of the face authentication system.

This completes the description of the configuration of the face authentication system 300. The operation sequence of the face authentication system 300 will be described below with reference to FIG. 4. Referring to FIG. 4, steps that perform the same processing as steps in FIG. 2 are assigned the same step numbers, and redundant descriptions thereof will be omitted.

The processing in FIG. 4 differs from the processing in FIG. 2 in steps S413 and S412. Steps S202 and S203 are executed in reverse order in FIGS. 2 and 4. However, the processing in steps S202 and S203 is the same as that in FIG. 2, and redundant descriptions thereof will be omitted.

When the feature amount extraction control unit 108 determines that the face authentication system 300 enters the steady state from the initial state, then in step S413, the feature amount extraction control unit 108 transmits the small-scale calculation feature quantity extraction parameters at that timing to the third feature quantity extraction unit 309. In the initial state, since the third feature quantity extraction unit 309 does not calculate the feature quantity (in-camera feature quantity), the small-scale calculation feature quantity extraction parameters are not required. In the steady state, however, the small-scale calculation feature quantity extraction parameters are required to calculate the in-camera feature quantity.

When the face authentication system 300 is in the steady state (NO in step S203), the processing proceeds to step S412. In step S412, the third feature quantity extraction unit 309 in the image input unit 301 subjects the face region image to the feature quantity extraction processing to calculate the in-camera feature quantity. Then, the authentication unit 310 subjects the input image to the collation processing by using the extracted in-camera feature quantity. In this case, the feature quantity extraction for the registered image is also performed by the third feature quantity extraction unit 309.

As described in detail above, the face authentication system 300 having the configuration according to the present modification operates as follows. More specifically, after a certain time period has elapsed since the operation of the face authentication system 300 is started, the feature quantity extraction can be performed only by the third feature quantity extraction unit 309. This enables performing the face authentication processing in the image input unit 301 without degrading the face authentication accuracy at the time of the initial state.

This enables performing the feature quantity extraction and the subsequent collation processing in the monitoring camera and reducing the load on the server, thus configuring a monitoring system with a low-price server. In particular, the effectiveness of the present modification is remarkably exhibited in a monitoring camera system in which a plurality of monitoring cameras is connected to one server.

According to the present modification, when the parameter update processing of the second feature quantity extraction unit 105 in the server is completed, the third feature quantity extraction unit 309 in the monitoring camera performs the feature quantity extraction by using the same parameters. However, if the communication environment between the server and the monitoring camera permits, the second feature quantity extraction unit 105 does not need to be disposed in the server. More specifically, the extracted feature quantity of the first feature quantity extraction unit 104 in the server may be compared with that of the third feature quantity extraction unit 309 in the monitoring camera, and then the parameters of the third feature quantity extraction unit 309 may be updated.

(Second Modification)

The above-described exemplary embodiment utilizes a large-scale neural network (the first feature quantity extraction unit 104) and a low-throughput neural network (the second feature quantity extraction unit 105 or the third feature quantity extraction unit 309). The above-described exemplary embodiment implements the face authentication by using a low-throughput neural network (student model) while maximally maintaining the authentication accuracy. The face authentication has conventionally been implemented based on large-scale learning using a large number of learning images and on a large-scale neural network (teacher model) using the learning result. To reduce the throughput while maintaining the authentication accuracy, the robustness of the face authentication is limited to the range of the robustness occurring under the installation condition of the camera that inputs processing target images.

The second modification will be described below centering on a method for adjusting the threshold value when the face authentication is performed by using a low-throughput neural network (student model) implemented in this way. The above-described exemplary embodiment centers on the collation processing that calculates the Euclidean distance between the feature quantity for the registered image and the feature quantity for the input image and, when the distance is smaller than the predetermined threshold value, determines that the face image of the input image belongs to the person of the registered image. A method for determining the predetermined threshold value according to the present modification will be described below.

Prior to the description of the method for determining the threshold value according to the present modification, a general method for determining a threshold value as well as an issue of the method will be described below. Generally, a threshold value is determined by using the learning images used in the learning for the feature quantity extraction or verification images (images used in the verification process, i.e., evaluation images) used in the verification (a process of determining the quality of the learning after the learning) for the feature quantity extraction. These learning and verification images are attached with a ground truth value (class label).

For example, a common method performs learning in advance through large-scale learning using a large number of learning images including diverse variations, subjects the verification images for determining a threshold value to the feature quantity extraction, and determines a threshold value by using the extracted feature quantity.

Figure 5:
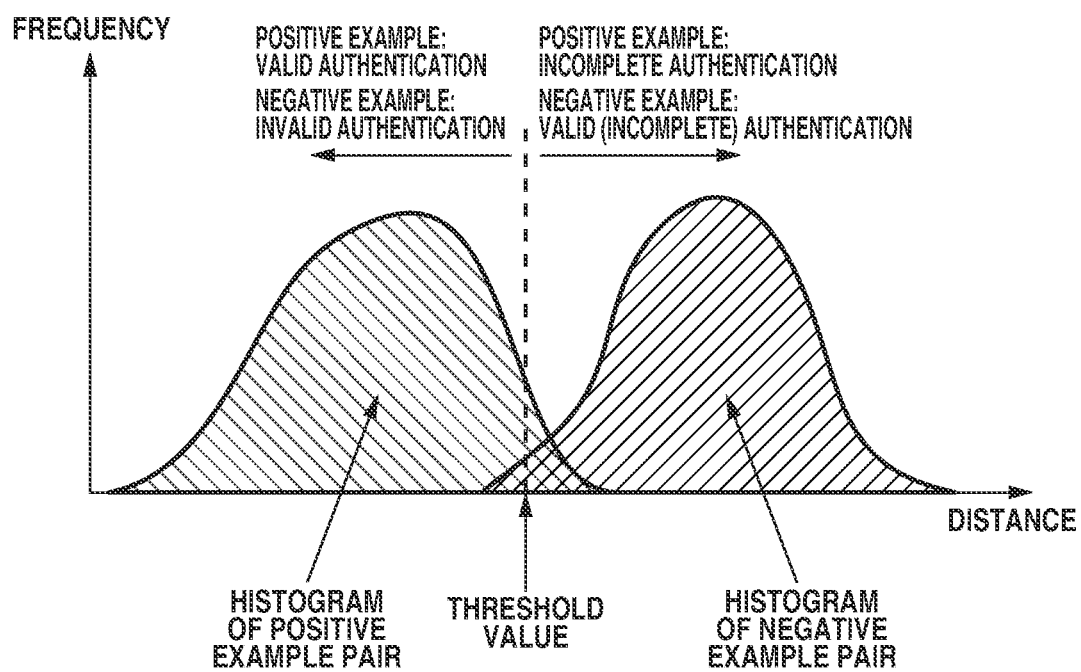
FIG. 5 illustrates histograms of a positive example and a negative example.

More specifically, a certain threshold value determination method calculates the Euclidean distance between feature quantities (a pair of feature quantities) extracted from the verification images, and generates a histogram representing the frequency as the number of pairs of feature quantities having the distance, with the horizontal axis assigned the distance. FIG. 5 illustrates two different histograms. One histogram is generated for a positive example pair (a pair of images of one and the same person) and the other histogram is generated for a negative example pair (a pair of images of different persons).

When a certain threshold value (distance threshold value) is determined, the frequency of positive examples having a distance larger than the distance threshold value denotes the number of incomplete authentications, and the frequency of negative examples having a distance smaller than the distance threshold value denotes the number of invalid authentications. The number of incomplete authentications divided by the total number of positive example pairs denotes the incomplete authentication rate, and the number of invalid authentications divided by the total number of negative example pairs denotes the invalid authentication rate.

Therefore, these pieces of information enable determining a suitable distance threshold value for each individual use case using the face authentication. More specifically, in a use case where invalid authentication is not permitted (e.g., the management of entering and leaving a room), the distance threshold value needs to be decreased to such an extent that invalid authentication does not occur for the verification images. Alternatively, in a use case where incomplete authentication is not permitted (e.g., person search), the distance threshold value needs to be increased to such an extent that incomplete authentication does not occur for the verification images. Generally, the threshold value is determined in this way.

However, the verification images are generally different from images obtained in the environment where cameras are practically installed (images practically input to the face authentication system). Therefore, it is highly likely that the histograms of the positive and negative example pairs generated by using the verification images are significantly different from the histograms of the positive and negative example pairs generated by using images captured under the practical operating environment in the shape and range (range of the frequency distribution for the distance axis). Therefore, it is desirable to determine the threshold value based on the histograms of the positive and negative example pairs generated by using images captured under the practical operating environment.

However, to generate histograms of the positive and negative example pairs for images captured under the practical operating environment, a ground truth value (class label) needs to be attached to the obtained images. The attachment of the ground truth value (class label) requires troublesome and time-consuming manual works, and is realistically impossible particularly when installing many cameras. Because of such a background, the threshold value is determined by using the verification images.

The method for determining the threshold value according to the present modification solves the above-described issue. Prior to detailed descriptions of the face authentication system according to the present modification, the intention of the present modification will be described below.

According to the above-described exemplary embodiment, in the initial state, the small-scale calculation feature quantity extraction parameters are updated so that the approximately identical model feature quantity and small-scale calculation feature quantity can be obtained with respect to face region images input by the image input unit. Therefore, after completion of the initial state, the approximately identical model feature quantity and small-scale calculation feature quantity can be obtained with respect to face region images input from the image input unit. In other words, a face region image with which the approximately identical model feature quantity and small-scale calculation feature quantity can be obtained is similar to an image input from the image input unit.

More specifically, after completion of the initial state, checking whether the model feature quantity and the small-scale calculation feature quantity are approximately identical enables determining whether the image is similar to the image input from the image input unit. Thus, the use of a large number of learning images (face region images for learning) including diverse variations used when the first feature quantity extraction unit is learned enables extracting images similar to images input from the image input unit, out of these face region images for learning (these extracted images are referred to as extracted learning images.)

Since a learning image is also attached with the ground truth value (class label), the extracted learning image as a part thereof is also attached with the ground truth value. This procedure makes it possible to obtain an image similar to the input image obtained in the practical operating environment (extracted learning image) together with the corresponding ground truth value. By generating the above-described histograms of the positive and the negative example pairs by using the extracted learning image and the corresponding ground truth value, histograms extremely close to the histograms of the positive and the negative example pairs generated by using images captured under the practical operating environment can possibly be obtained. A threshold value that is most suitable even under the practical operating environment can be obtained by calculating threshold value from the histograms obtained by using the extracted learning images and the corresponding ground truth values. This completes the description of the overview of the present modification.

Figure 6:
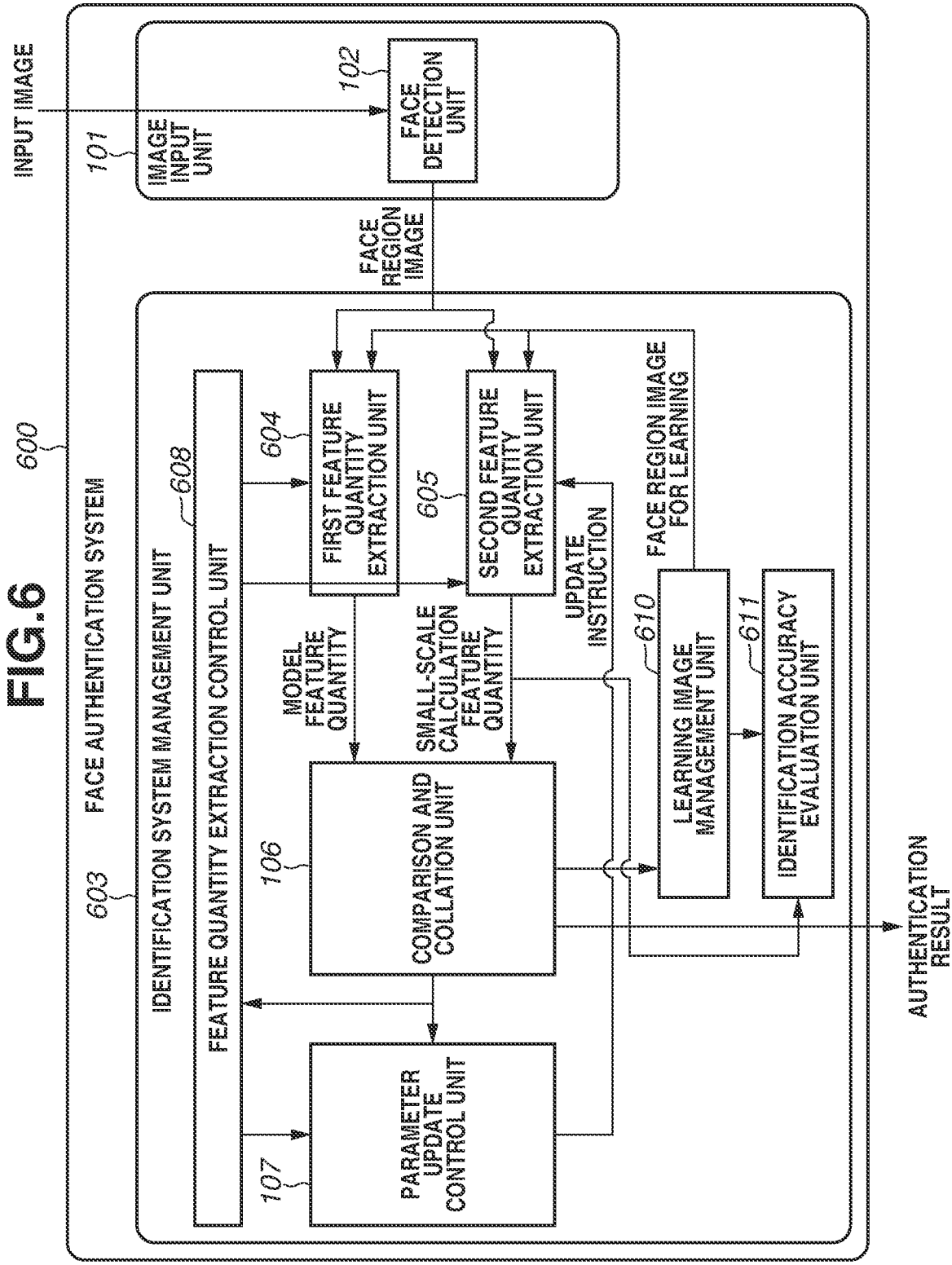
FIG. 6 is a block diagram illustrating still another face authentication system.

The present modification will be described in detail below with reference to the accompanying drawings. FIG. 6 is a block diagram illustrating a configuration of a face authentication system 600 according to the present modification. Referring to FIG. 6, components having the same meaning to those in FIG. 1 are assigned the same reference numerals, and redundant descriptions thereof will be omitted.

Like the above-described exemplary embodiment, the operation of the face authentication system 600 is controlled by a feature quantity extraction control unit 608. Although the feature quantity extraction control unit 108 according to first exemplary embodiment switches between the two different states, i.e., the initial state and the steady state, the feature quantity extraction control unit 608 according to the present modification switches between three different states, i.e., the initial state, the threshold value calculation state, and the steady state.

The state transition according to the present modification includes the threshold value calculation state in the transition from the initial state to the steady state according to the first exemplary embodiment. The operations of face authentication system 600 in the initial state and the steady state are similar to the operations of the face authentication system 100 according to the first exemplary embodiment, and redundant descriptions thereof will be omitted. Also, the transition condition from the initial state to the threshold value calculation state is similar to the transition condition from the initial state to the steady state according to the first exemplary embodiment, and redundant descriptions thereof will be omitted. The face authentication system 600 enters the steady state after completion of the threshold value calculation in the threshold value calculation state.

Each block in the threshold value calculation state specific to the present modification will be described below.

In the threshold value calculation state, the identification system management unit 603 also performs a threshold value calculation processing (described in detail below) in addition to the operation of the identification system management unit 103 according to the first exemplary embodiment.

The face region image transmitted from the image input unit 101 and the face region image for learning transmitted from a learning image management unit 610 are selectively input to ae first feature quantity extraction unit 604 and a second feature quantity extraction unit 605. Which image is to be input is determined by an instruction of the feature quantity extraction control unit 608. In the threshold value calculation state, the face region images for learning are input. The output of the second feature quantity extraction unit 605 is also output to an identification accuracy evaluation unit 611. Other operations are the same as the operations of the first feature quantity extraction unit 104 and the second feature quantity extraction unit 105 according to the first exemplary embodiment, and redundant descriptions thereof will be omitted.

A comparison and collation unit 606 is also capable of outputting the comparison result to the learning image management unit 610 in addition to the operation of the comparison and collation unit 106 according to the first exemplary embodiment. The comparison and collation unit 606 switches the output destination of the comparison result between the parameter update control unit 107 and the learning image management unit 610 according to an instruction of the feature quantity extraction control unit 608. In the threshold value calculation state, the comparison and collation unit 606 outputs the comparison result to the learning image management unit 610.

In the threshold value calculation state, the feature quantity extraction control unit 608 controls the first feature quantity extraction unit 604 and the second feature quantity extraction unit 605 to input the face region images for learning transmitted from the learning image management unit 610. The first feature quantity extraction unit 604 and the second feature quantity extraction unit 605 calculate feature quantities (model feature quantity and small-scale calculation feature quantity) for the face region images for learning, and then output the calculated feature quantities to the comparison and collation unit 606.

The learning image management unit 610 stores and manages a large number of learning images (face region images for learning) including diverse variations used at the time of the learning of the first feature quantity extraction unit 604 and corresponding ground truth values (class labels) in association with each other. In the threshold value calculation state, the learning image management unit 610 supplies the face region images for learning to the first feature quantity extraction unit 604 and the second feature quantity extraction unit 605 according to an instruction of the feature quantity extraction control unit 608.

The learning image management unit 610 also instructs the identification accuracy evaluation unit 611 to receive or not to receive the small-scale calculation feature quantity as a basis of the comparison result according to the comparison result (e.g., the Euclidean distance between the two feature quantities) output from the comparison and collation unit 606. When the Euclidean distance between the two feature quantities is smaller than a predetermined threshold value, the learning image management unit 610 instructs the identification accuracy evaluation unit 611 to receive the small-scale calculation feature quantity as a basis of the comparison result. In this case, the learning image management unit 610 also transmits the ground truth value (class label) attached to the face region image for learning as the calculation source of the small-scale calculation feature quantity. When the learning image management unit 610 has supplied all of the face region images for learning managed by itself to the first feature quantity extraction unit 604 and the second feature quantity extraction unit 605, the learning image management unit 610 instructs the identification accuracy evaluation unit 611 to start the evaluation.

The identification accuracy evaluation unit 611 accumulates the ground truth value (class label) transmitted from the learning image management unit 610 and the small-scale calculation feature quantity transmitted from the second feature quantity extraction unit 605. Subsequently, the identification accuracy evaluation unit 611 calculates a suitable threshold value based on the accumulated small-scale calculation feature quantity and ground truth value according to an instruction from the learning image management unit 610. As a threshold value calculation method, it is necessary to generate histograms by using the positive and the negative example pairs as described above, and calculate a threshold value suitable for the use case. Since the face region images for learning managed by the learning image management unit 610 is attached with the ground truth value (class label), the histogram generation is possible. This completes the description of the configuration of the face authentication system 600.

Figure 7:
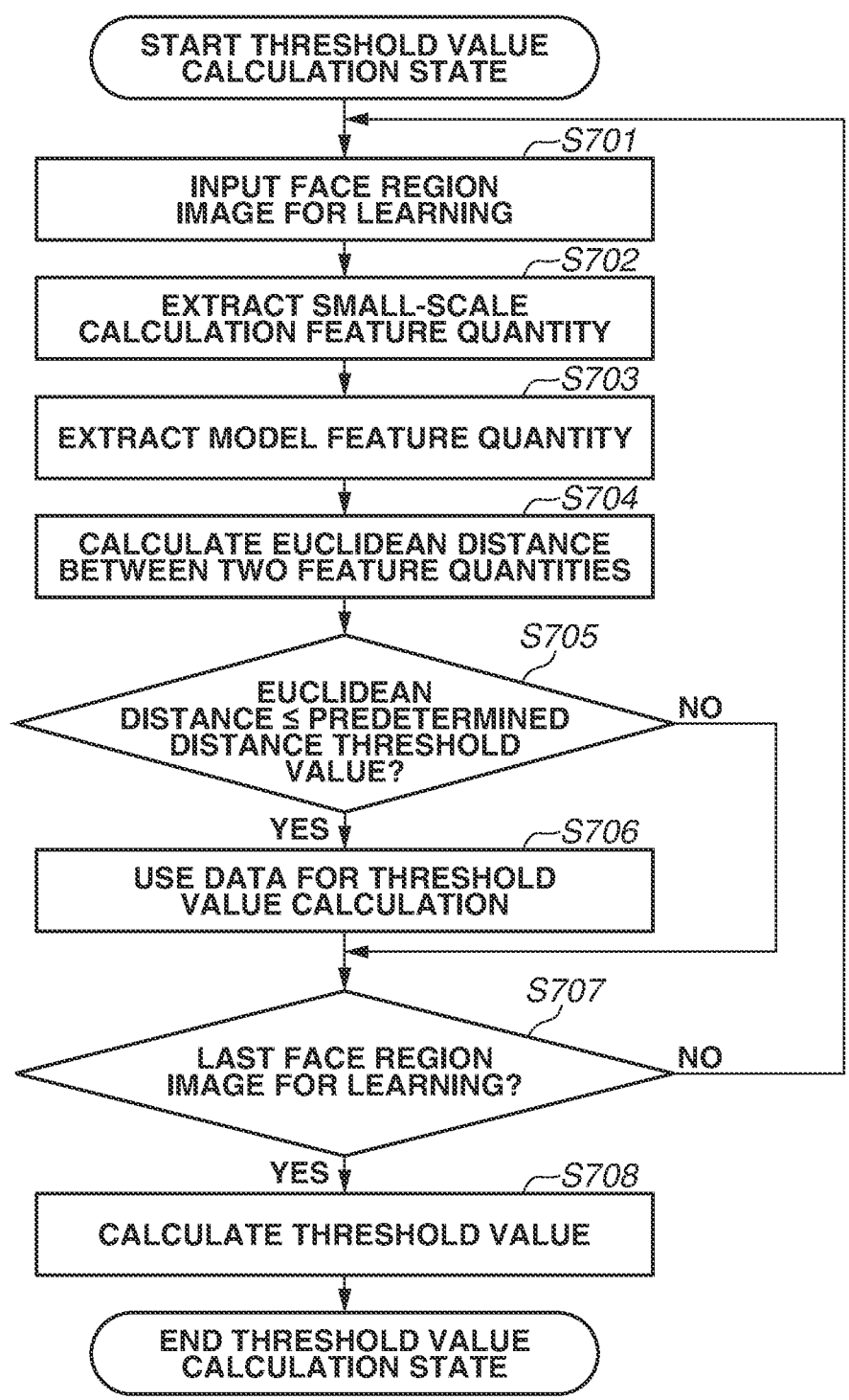
FIG. 7 is a processing flowchart illustrating a threshold value calculation state.

Subsequently, an operation sequence of the face authentication system 600 will be described below with reference to FIG. 7. However, of operation sequences of the face authentication system 600, the operation sequences for the initial state and the steady state are the same as those in FIG. 2, and redundant descriptions thereof will be omitted. Only the operation sequence for the threshold value calculation state is illustrated in FIG. 7. The operation sequence in FIG. 7 is performed next to step S210 in all of the operation sequences of the face authentication system illustrated in FIG. 2. When the operation sequence in FIG. 7 is completed, the processing returns to step S211.

In step S701, the learning image management unit 610 supplies the face region image for learning to the second feature quantity extraction unit 605 and the first feature quantity extraction unit 604. In step S702, the small-scale calculation feature quantity is extracted. In step S703, the model feature quantity is extracted.

In step S704, the comparison and collation unit 606 calculates the Euclidean distance between the two feature quantities. In step S705, the comparison and collation unit 606 determines whether the calculated Euclidean distance is smaller than a preset predetermined distance threshold value. When the Euclidean distance is smaller than the predetermined distance threshold value (YES in step S705), the processing proceeds to step S706. In step S706, the small-scale calculation feature quantity and the corresponding ground truth value are extracted as data to be used for the subsequent threshold value calculation and then the data in the identification accuracy evaluation unit 611 is accumulated.

In step S707, it is checked whether the processing in steps S701 to S705 (or step S706) has been completed for all of the face region images for learning managed by the learning image management unit 610. When the processing is completed for all of the face region images for learning (YES in step S707), the processing proceeds to step S708. In step S708, the identification accuracy evaluation unit 611 calculates the threshold value. The calculated threshold value is used for the collation processing to be performed in the subsequent steady state. This completes the description of the operation sequence in the threshold value calculation state.

As described in detail above, by configuring the face authentication system 600 according to the present modification, histograms extremely close to the histograms of the positive and the negative example pairs generated by using images captured under the practical operating environment can possibly be obtained. A suitable threshold value can be calculated based on the histograms.

(Third Modification)

The third modification will be described below centering on the operation when a plurality of image input units is provided. Generally, when a plurality of image input units is provided, the same number of second feature quantity extraction units as the number of image input units are required. The first feature quantity extraction unit is common to the plurality of image input units. The present modification can be implemented since the plurality of image input units shares one first feature quantity extraction unit.

In this case, depending on the number of image input units, it is predicted that operating the same number of second feature quantity extraction units as the number of image input units is unrealistic in terms of calculation resources. In such a case, it is also possible to group the plurality of image input units into groups and associate one second feature quantity extraction unit with each group.

When grouping the image input units, the image input units need to be grouped based on the installation condition under which the image input units are installed. It is expected that similar images are transmitted from the image input units installed under a similar installation condition.

FIG. 8 illustrates a face authentication system configured in this way. Referring to FIG. 8, components having the same meaning as those in FIG. 1 are assigned the same reference numerals, and redundant descriptions thereof will be omitted. A face authentication system 800 and an identification system management unit 803 are the same as the face authentication system 100 and the identification system management unit 103, respectively, and redundant descriptions thereof will be omitted. The face authentication system 800 differs from the face authentication system 100 in that there is provided a plurality of image input units and a plurality of second feature quantity extraction units.

Operations of second feature quantity extraction units 1050 to 1052 are the same as the operation of the second feature quantity extraction unit according to the first exemplary embodiment. To prevent the drawing from becoming complicated, arrows illustrating outputs from the second feature quantity extraction units are omitted. Operations of the image input unit 1010 to 1013 are the same as the operation of the image input unit according to the first exemplary embodiment. Referring to FIG. 8, the image input units 1012 and 1013 are grouped into the same group, and supply the face region image to the identical second feature quantity extraction unit 1052. The image input units 1012 and 1013 are assumed to be installed under a similar condition (for example, cameras for managing entering and leaving a room installed at the entrances of different rooms in the same building).

An image input group management unit 810 groups the plurality of image input units based on the installation condition and manages the image input units belonging to the same group in association with the same feature quantity extraction parameters.

The image input group management unit 810 is required particularly when updated parameters need to be transmitted to the image input unit as in the first modification. In this case, the image input group management unit 810 manages the second feature quantity extraction unit from which the parameters are to be transmitted, and the image input unit as the transmission destination of the parameters.

Other Exemplary Embodiments

The above-described exemplary embodiment premises that the first feature quantity extraction unit stops calculating the model feature quantity when the face authentication system enters the steady state. However, control may be performed to gradually decrease the frequency of the model feature quantity calculation based on the comparison result by the comparison and collation unit. Performing control in this way enables periodically confirming the difference between the model feature quantity and the small-scale calculation feature quantity even after the face authentication system enters the steady state. This enables applying this configuration even when the tendency of images input from the image input unit suddenly changes for a certain reason.

The above-described exemplary embodiment also premises that the input face image that has been used when updating the small-scale calculation feature quantity extraction parameters in the initial state is used for the parameter update processing only once. However, the input face image may be accumulated and then reused for the subsequent parameter update processing. It is expected that using more various images for the parameter update processing enables obtaining parameters having the higher robustness.

Although the above-described exemplary embodiment assumes that the initial state starts when the face authentication system starts operating, the present invention is not limited thereto. If the event occurs that the installation location of the image input unit that has been once installed and entered the steady state is changed, the face authentication system is controlled to start from the initial state again.

The present invention can also be achieved when a program for implementing at least one of the functions according to the above-described exemplary embodiments is supplied to a system or apparatus via a network or storage medium, and at least one processor in a computer of the system or apparatus reads and executes the program. Further, the present invention can also be achieved by a circuit (for example, an application specific integrated circuit (ASIC)) for implementing at least one function.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention makes it possible to implement high-precision face authentication with a low throughput.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
one or more memories storing instructions; and
one or more processors that, upon execution of the stored instructions, are configured to:

receive a first captured image captured by a first camera and a second captured image captured by a second camera;
perform first extraction processing on the first captured image to extract a first model feature quantity and on the second captured image to extract a second model feature quantity;
perform second extraction processing having a lower throughput than the first extraction processing on the first captured image to extract a first small-scale feature quantity and on the second captured image to extract a second small-scale feature quantity;
compare the first model feature quantity with the first small-scale feature quantity to obtain a first comparison result and compare the second model feature quantity with the second small-scale feature quantity to obtain a second comparison result; and
based on the first comparison result, update first parameters to be used in the second extraction processing on an image captured by the first camera, and based on the second comparison result, update second parameters to be used in the second extraction processing on an image captured by the second camera,
wherein the first comparison result includes a difference between the first model feature quantity and the first small-scale feature quantity,
wherein the second comparison result includes a difference between the second model feature quantity and the second small-scale feature quantity,
wherein the one or more processors are further configured to perform control,
in an initial state for updating the first parameters and the second parameters, to perform the first extraction processing and the second extraction processing in parallel,
during a transition from the initial state to a steady state, to gradually reduce performing the first extraction processing to update the first parameters, based on the first comparison result and to perform the second extraction processing,
during a transition from the initial state to a steady state, to gradually reduce performing the first extraction processing to update the second parameters, based on the second comparison result and to perform the second extraction processing,
to determine that the image processing apparatus is in the steady state for the first camera in a case where the number of times that the difference between the first model feature quantity and the first small-scale feature quantity for a predetermined number of captured images received from the first camera is determined to be smaller than a threshold value is equal to or greater than a predetermined number of times, and
to determine that the image processing apparatus is in the steady state for the second camera in a case where the number of times that the difference between the second model feature quantity and the second small-scale feature quantity for a predetermined number of captured images received from the second camera is determined to be smaller than a threshold value is equal to or greater than a predetermined number of times.

2. The image processing apparatus according to claim 1, whether the one or more processors are further configured to authenticate a subject included in the first captured image based on the first model feature quantity or the first small-scale feature quantity.

3. The image processing apparatus according to claim 1, wherein, in a steady state, the one or more processors perform control to perform the second extraction processing without performing the first extraction processing.

4. The image processing apparatus according to claim 1, wherein, the one or more processors perform control to gradually reduce a frequency of performing the first extraction processing to update the first parameters, based on the first comparison result, and control to gradually reduce a frequency of performing the first extraction processing to update the second parameters, based on the second comparison result.

5. The image processing apparatus according to claim 4, wherein, the one or more processors controls the update to gradually reduce a frequency of updating the first parameters in comparison with the initial state based on the first comparison result, and controls the update to gradually reduce a frequency of updating the second parameters in comparison with the initial state based on second comparison result.

6. The image processing apparatus according to claim 1, wherein the one or more processors determine whether the image processing apparatus is in a steady state based on the first and second comparison results.

7. The image processing apparatus according to claim 1, wherein, in a steady state, the one or more processors perform control to cancel updating the first parameters and the second parameters.

8. The image processing apparatus according to claim 1, wherein parameters used for the second extraction processing are smaller in size than parameters used for the first extraction processing.

9. The image processing apparatus according to claim 1, wherein the one or more processors are further configured to:
   obtain learning images each including a ground truth value; and
   select an evaluation image from the learning images based on a comparison result comparing a model feature quantity obtained by the first extraction processing on each of the learning images with a small-scale feature quantity obtained by the second extraction processing on each of the learning images; and
   evaluate an identification accuracy for the evaluation image by using a small-scale feature quantity obtained from the evaluation image and a ground truth value of the evaluation image.

10. An image input apparatus connected with the image processing apparatus according to claim 1, the image input apparatus comprising:
   one or more memories storing instructions; and
   one or more processors that, upon execution of the stored instructions, are configured to:
   input the first captured image captured by a capturing unit to the image processing apparatus;
   receive the first parameters updated based on the first comparison result by the image processing apparatus; and
   extract a third small-scale feature quantity from a third captured image captured by the capturing unit by using the updated parameters received from the image processing apparatus.

11. The image input apparatus according to claim 10, wherein the one or more processors are further configured to authenticate a subject included in the third captured image based on the third small-scale feature quantity.

12. An image processing system comprising:
the image processing apparatus according to claim 1; and
a plurality of image input apparatuses connected with the image processing apparatus,
wherein the image input apparatuses each comprises:
one or more memories storing instructions; and
one or more processors that, upon execution of the stored instructions, are configured to:
input the first captured image captured by a capturing unit to the image processing apparatus;
receive the first parameters updated based on the first comparison result by the image processing apparatus; and
extract a third small-scale feature quantity from a third captured image captured by the capturing unit by using the updated parameters received from the image processing apparatus.

13. An image processing method comprising:
receiving a first captured image captured by a first camera and a second captured image captured by a second camera;
performing first extraction processing on the first captured image to extract a first model feature quantity and on the second captured image to extract a second model feature quantity;
performing second extraction processing having a lower throughput than the first extraction processing on the first captured image to extract a first small-scale feature quantity and on the second captured image to extract a second small-scale feature quantity;
comparing the first model feature quantity with the first small-scale feature quantity to obtain a first comparison result;
comparing the second model feature quantity with the second small-scale feature quantity to obtain a second comparison result;
based on the first comparison result, updating first parameters to be used in the second extraction processing on an image captured by the first camera; and
based on the second comparison result, updating second parameters to be used in the second extraction processing on an image captured by the second camera,
wherein the first comparison result includes a difference between the first model feature quantity and the first small-scale feature quantity,
wherein the second comparison result includes a difference between the second model feature quantity and the second small-scale feature quantity,
in an initial state for updating the first parameters and the second parameters, to perform the first extraction processing and the second extraction processing in parallel,
during a transition from the initial state to a steady state, to gradually reduce performing the first extraction processing to update the first parameters. based on the first comparison result and to perform the second extraction processing,
during a transition from the initial state to a steady state, to gradually reduce performing the first extraction processing to update the second parameters, based on the second comparison result and to perform the second extraction processing,
to determine that the image processing apparatus is in the steady state for the first camera in a case where the number of times that the difference between the first model feature quantity and the first small-scale feature quantity for a predetermined number of captured images received from the first camera is determined to be smaller than a threshold value is equal to or greater than a predetermined number of times, and to determine that the image processing apparatus is in the steady state for the second camera in a case where the number of times that the difference between the second model feature quantity and the second small-scale feature quantity for a predetermined number of captured images received from the second camera is determined to be smaller than a threshold value is equal to or greater than a predetermined number of times.

14. A non-transitory computer-readable storage medium storing therein a program for causing a computer to perform the method according to claim 13.

15. The image processing apparatus according to claim 1, wherein the one or more processors extract the first model feature quantity by the first extraction processing on the first captured image using a first neural network and extract the first small-scale feature quantity by the second extraction processing on the first captured image using a second neural network, and wherein the one or more processors extract the second model feature quantity by the first extraction processing on the second captured image using the first neural network and extract the second small-scale feature quantity by the second extraction processing on the second captured image using a third neural network.

* * * * *